(12) United States Patent
Arimoto

(10) Patent No.: US 11,002,060 B2
(45) Date of Patent: *May 11, 2021

(54) DRIVE UNIT ASSEMBLY FOR A WINDOW REGULATOR

(71) Applicant: HI-LEX CONTROLS, INC., Rochester Hills, MI (US)

(72) Inventor: Shigeki Arimoto, Bloomfield Hills, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,685

(22) Filed: Sep. 22, 2020

(65) Prior Publication Data

US 2021/0003156 A1 Jan. 7, 2021

Related U.S. Application Data

(63) Continuation-in-part of application No. 16/132,920, filed on Sep. 17, 2018.

(51) Int. Cl.
| | |
|---|---|
| *E05F 15/689* | (2015.01) |
| *F16B 5/02* | (2006.01) |
| *E05F 11/48* | (2006.01) |
| *E05F 15/686* | (2015.01) |
| *E05F 15/643* | (2015.01) |

(Continued)

(52) U.S. Cl.
CPC .......... *E05F 15/689* (2015.01); *E05F 11/486* (2013.01); *E05F 11/488* (2013.01); *E05F 15/643* (2015.01); *E05F 15/686* (2015.01); *F16B 5/02* (2013.01); *B65H 75/4471* (2013.01); *B65H 75/4486* (2013.01); *E05F 15/627* (2015.01); *E05Y 2201/434* (2013.01); *E05Y 2201/654* (2013.01); *E05Y 2600/46* (2013.01); *E05Y 2600/51* (2013.01);
(Continued)

(58) Field of Classification Search
None
See application file for complete search history.

(56) References Cited

U.S. PATENT DOCUMENTS

| | | |
|---|---|---|
| 5,890,321 A | 4/1999 | Staser et al. |
| 6,574,922 B2 | 6/2003 | Velthaus et al. |

(Continued)

FOREIGN PATENT DOCUMENTS

| | | |
|---|---|---|
| DE | 102016212041 A1 | 1/2018 |
| EP | 2728097 A1 | 5/2014 |

(Continued)

*Primary Examiner* — Marcus Menezes
(74) *Attorney, Agent, or Firm* — Dickinson Wright PLLC

(57) ABSTRACT

A window regulator for a motor vehicle includes a drive unit assembly with a module plate. The drive unit for the window regulator includes a cable drum housing with a cable drum and a motor assembly. The cable drum housing includes a stepped annular ring extended from the cable drum housing and a snap-fit post protruded from each of the stepped annular ring for engaging with the module plate. The cable drum housing is positioned on a receiving site of the module plate, and the stepped annular ring and the snap-fit post is coupled with a locating site on the receiving site. Each locating site includes a circular bead for engaging with the stepped annular ring of the cable drum housing.

9 Claims, 7 Drawing Sheets

(51) Int. Cl.
  *F16B 5/06* (2006.01)
  *B65H 75/44* (2006.01)
  *E05F 15/627* (2015.01)

(52) U.S. Cl.
  CPC ....... *E05Y 2600/53* (2013.01); *E05Y 2900/55* (2013.01); *F16B 5/0664* (2013.01)

(56) References Cited

U.S. PATENT DOCUMENTS

| | | | |
|---|---|---|---|
| 7,823,329 B2 * | 11/2010 | Stahn | E05F 11/48 49/352 |
| 8,024,892 B2 | 9/2011 | Brauer et al. | |
| 8,336,259 B2 | 12/2012 | Ishida et al. | |
| 2008/0127563 A1 * | 6/2008 | Tooker | E05F 15/635 49/349 |
| 2008/0223164 A1 * | 9/2008 | Greulich | F16H 57/021 74/425 |
| 2013/0152714 A1 | 6/2013 | Imaoka | |
| 2015/0322706 A1 * | 11/2015 | Yamamoto | E05F 11/488 49/349 |
| 2016/0036287 A1 * | 2/2016 | Hazel | E05F 15/697 310/83 |
| 2017/0335929 A1 | 11/2017 | Makino et al. | |
| 2017/0370145 A1 | 12/2017 | Koike et al. | |
| 2019/0203519 A1 * | 7/2019 | Kalb | E05F 15/697 |

FOREIGN PATENT DOCUMENTS

| WO | WO-2008138122 A1 * | 11/2008 | ............. E05D 15/16 |
|---|---|---|---|
| WO | 2014077036 A1 | 5/2014 | |

\* cited by examiner

DRIVE UNIT ASSEMBLY FOR A WINDOW REGULATOR

CROSS-REFERENCE TO RELATED APPLICATION

This application is a continuation-in-part of U.S. patent application Ser. No. 16/132,920, filed Sep. 17, 2018, the contents of which are incorporated herein by reference in their entirety.

FIELD

The present application relates to a drive unit assembly for a window regulator potentially suited for various applications but in a preferred implementation is utilized in an automotive window regulator assembly.

BACKGROUND

The statements in this section merely provide background information related to the present disclosure and may not constitute prior art. Passenger car and light truck motor vehicles typically feature movable side door glass. A mechanism is required to move the glass between the upper closed position and the lower opened position. These mechanisms are generally known as window regulators. Window regulators can be manually operated, or can be driven by a power actuator, most commonly employing an electric motor. Many window regulator mechanisms are generally well-known technologies.

One type of the window regulator uses a drive unit having a cable driven by an electric motor through a cable drum. These types frequently incorporate a motor assembly which includes a gear housing formed of molded plastic which must be assembled and connected to a cable drum and a cable drum housing, which drive unit is in turn mounted to a door inner panel. Accordingly, the assembled drive unit is generally attached to the door inner panel such as a sheet metal for supporting a driving force exerted by a cable in the window regulator. Despite the satisfactory performance of the conventional drive unit including motor assembly and cable drum housing in the window regulators, there is constantly a desire to reduce cost, simplify assembly and reduce weight of automotive components, while providing a desirable durability, low warranty claims, and compliance with performance requirements.

The above information disclosed in this Background section is only for enhancement of understanding of the background of the present disclosure and therefore it may contain information that does not form the prior art that is already known to a person of ordinary skill in the art.

SUMMARY

The present disclosure generally provides a drive unit assembly for a window regulator in a motor vehicle. The drive unit for the window regulator is generally assembled with a module plate inside a door. The drive unit includes a cable drum housing with a cable drum and a motor assembly. The cable drum housing includes a stepped annular ring extended from the cable drum housing, and a snap-fit post, which has a first end attached to the stepped annular ring of the cable drum housing and a second end as an opposite side of the first end. The snap-fit post is concentric with the stepped annular ring and has a smaller diametric size than the stepped annular ring. The module plate has a locating site configured for receiving the snap-fit post of the cable drum housing. The locating site includes a circular bead for engaging with the stepped annular ring of the cable drum housing and a central opening for coupling with the snap-fit post.

According to an aspect of the present disclosure, the circular bead includes a first crush rib on an inner surface of the circular bead. The stepped annular ring may include a second crush rib on its circumferential outer surface.

According to an aspect of the present disclosure, the stepped annular ring is press fitted inside the circular bead of the module plate in an assembled configuration. The circular bead on the locating site of the module plate encircles the stepped annular ring of the cable drum housing. A diameter of the stepped annular ring is smaller than an inner diameter of the circular bead.

According to an aspect of the present disclosure, the snap-fit post passes through the central opening of the locating site, and is fitted into a mating socket of a motor assembly on a second side of the module plate. The fitted snap-fit post of the cable drum housing inside the mating socket of the motor assembly is fastened by a screw element. The cable drum housing further includes a central cavity for receiving the cable drum, and a journal bearing for engaging with an end of a splined stub shaft of the motor assembly.

According to another aspect of the present disclosure, an stepped annular ring extending from the cable drum housing includes a top surface sloped radially outwardly from a center axis of the stepped annular ring such that the top surface is formed with a convex shape. The locating site of the module plate includes a mating surface, which is enclosed by the circular bead and contacted to the top surface of the stepped annular ring in an assembled configuration. The mating surface of the locating site is also sloped radially outwardly from a center axis of the central opening such that the mating surface is formed with a concave shape, which is entirely contacted and fitted to the convex shape of the top surface of the stepped annular ring. In the assembled configuration, the convex top surface and the concave mating surface are compressively secured such that the top and mating surfaces prevent a movement of the cable drum housing in a vehicle condition. In particular, the convex-concave configuration prevents a lateral movement of the cable drum housing.

According to another aspect of the present disclosure, the convex-concave shape is swapped such that the top surface of the stepped annular ring is formed with a concave shape and the mating surface of the locating site is formed with a convex shape. The swapped convex-concave configuration in both surfaces also prevents the lateral movement of the cable drum housing in a vehicle condition.

Further areas of applicability will become apparent from the description provided herein. Everyone should understand that the description and specific examples presented herein are for the purpose of illustration only and are not intended to limit the scope of the present disclosure.

DRAWINGS

In order that the disclosure may be well understood, there will now be described various forms thereof, given by way of example, reference being made to the accompanying drawings, in which.

Figure 6:
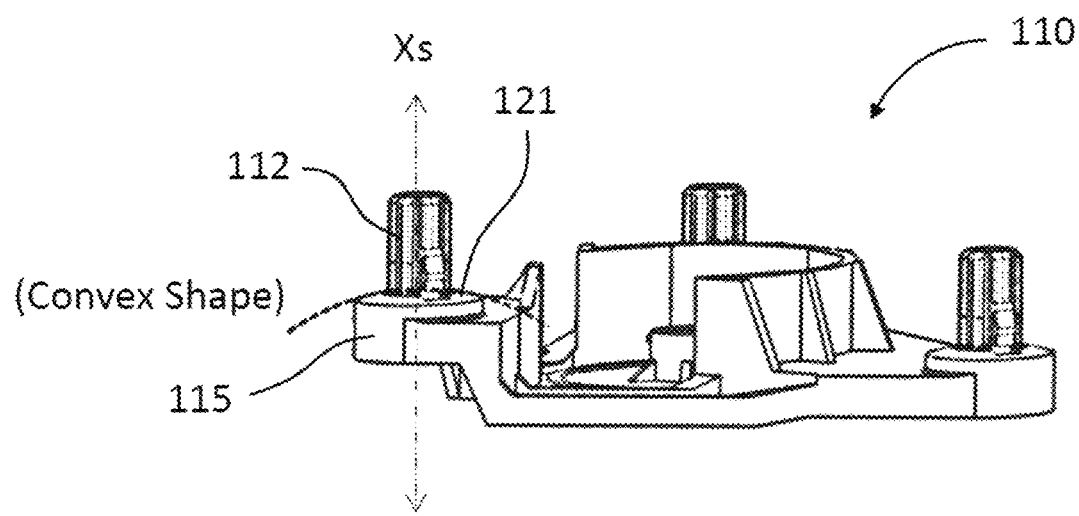
FIG. 6 is a perspective view of a cable drum housing having a convex top surface in accordance with another form of the present disclosure.
Figure 6A:
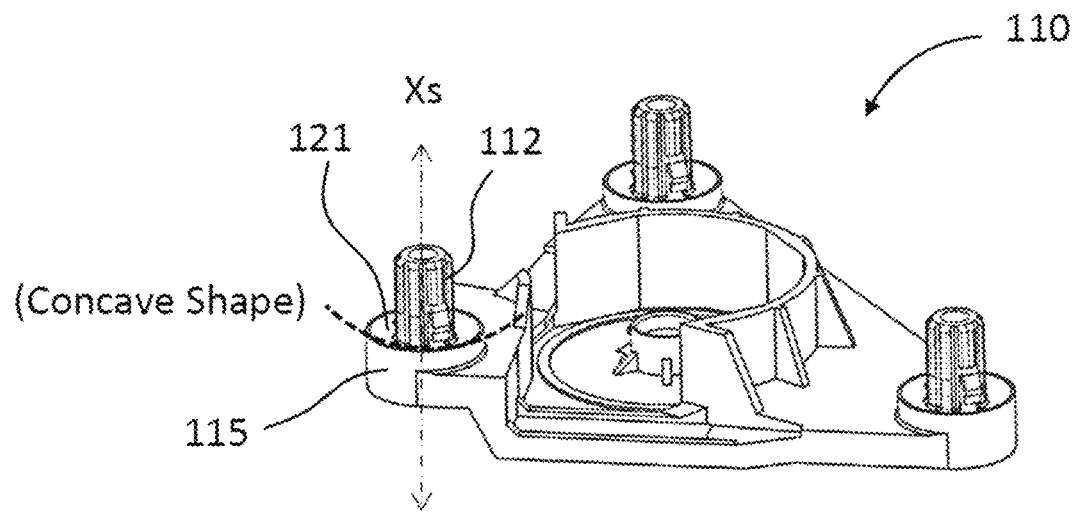
FIG. 6A is a perspective view of a cable drum housing having a concave top surface in accordance with another form of the present disclosure.
Figure 7:
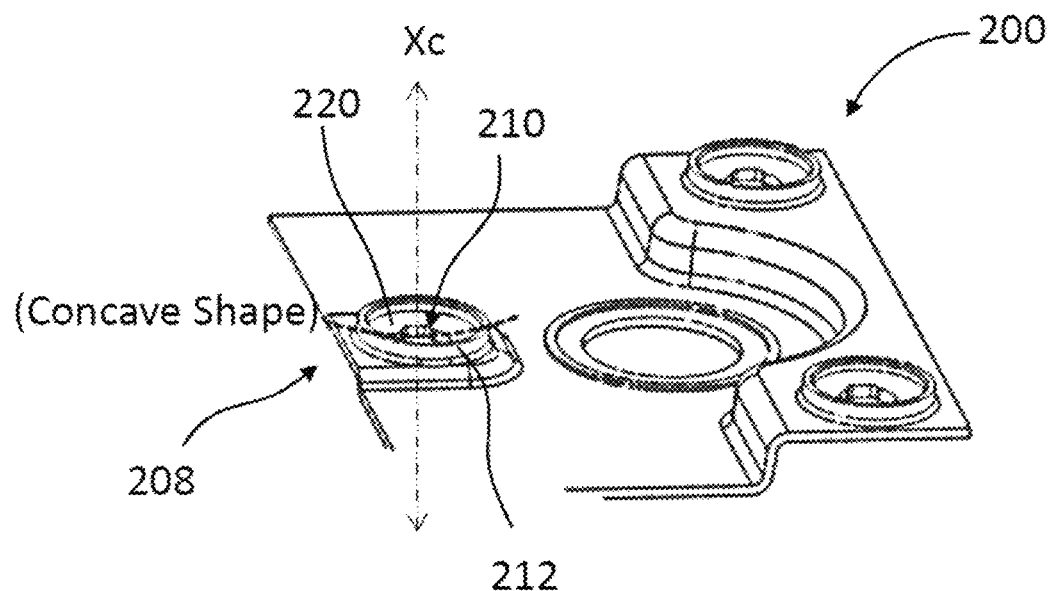
Figure 7A:
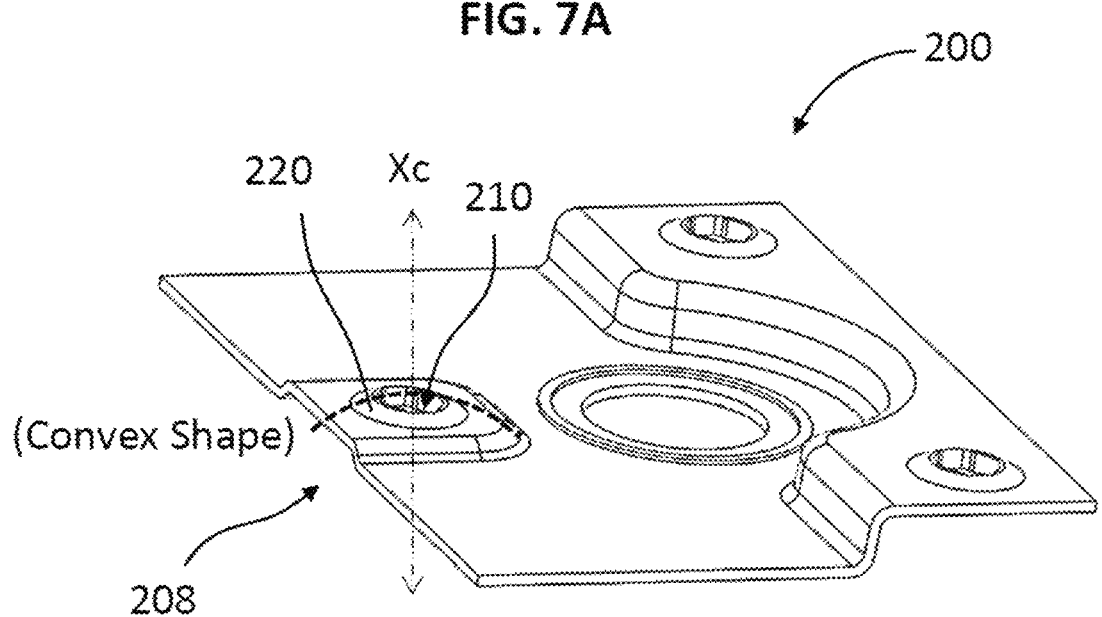
Figure 8:
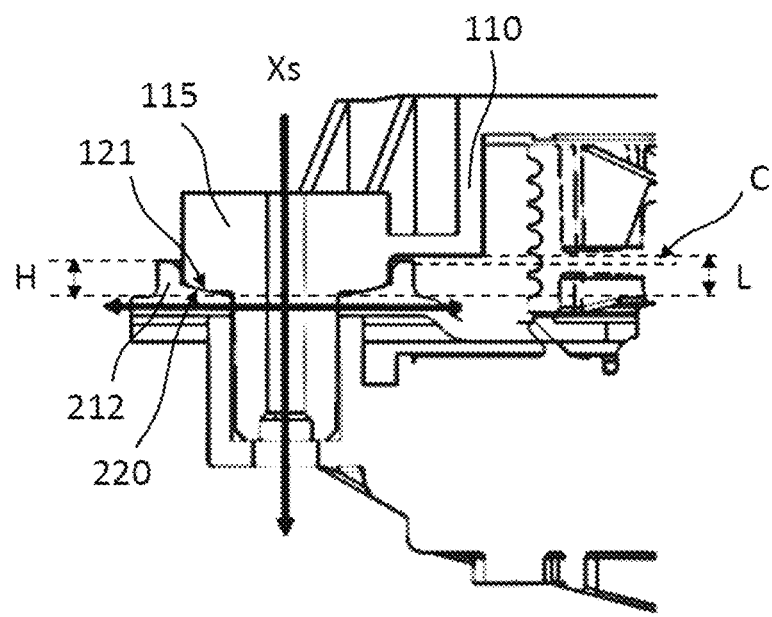
Figure 8A:
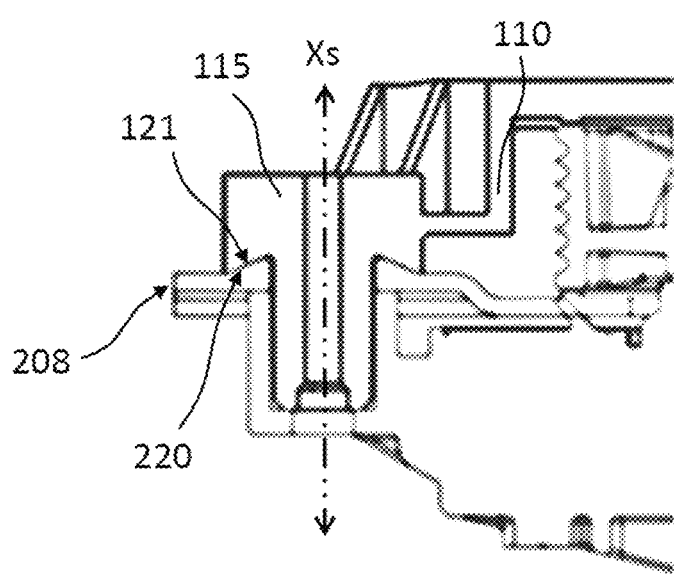

FIG. 7 is a perspective view of the receiving site of the module plate having a concave mating surface in accordance with another form of the present disclosure, and FIG. 7A is a perspective view of the receiving site of the module plate having a convex mating surface in accordance with another form of the present disclosure; and FIG. 8 is a cross-sectional view of the drive unit assembly with the module plate having a convex-concave configuration of FIGS. 6 and 7, and FIG. 8A is a cross-sectional view of the drive unit assembly with the module plate having a swapped convex-concave configuration of FIGS. 6A and 7A.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

Figure 1:
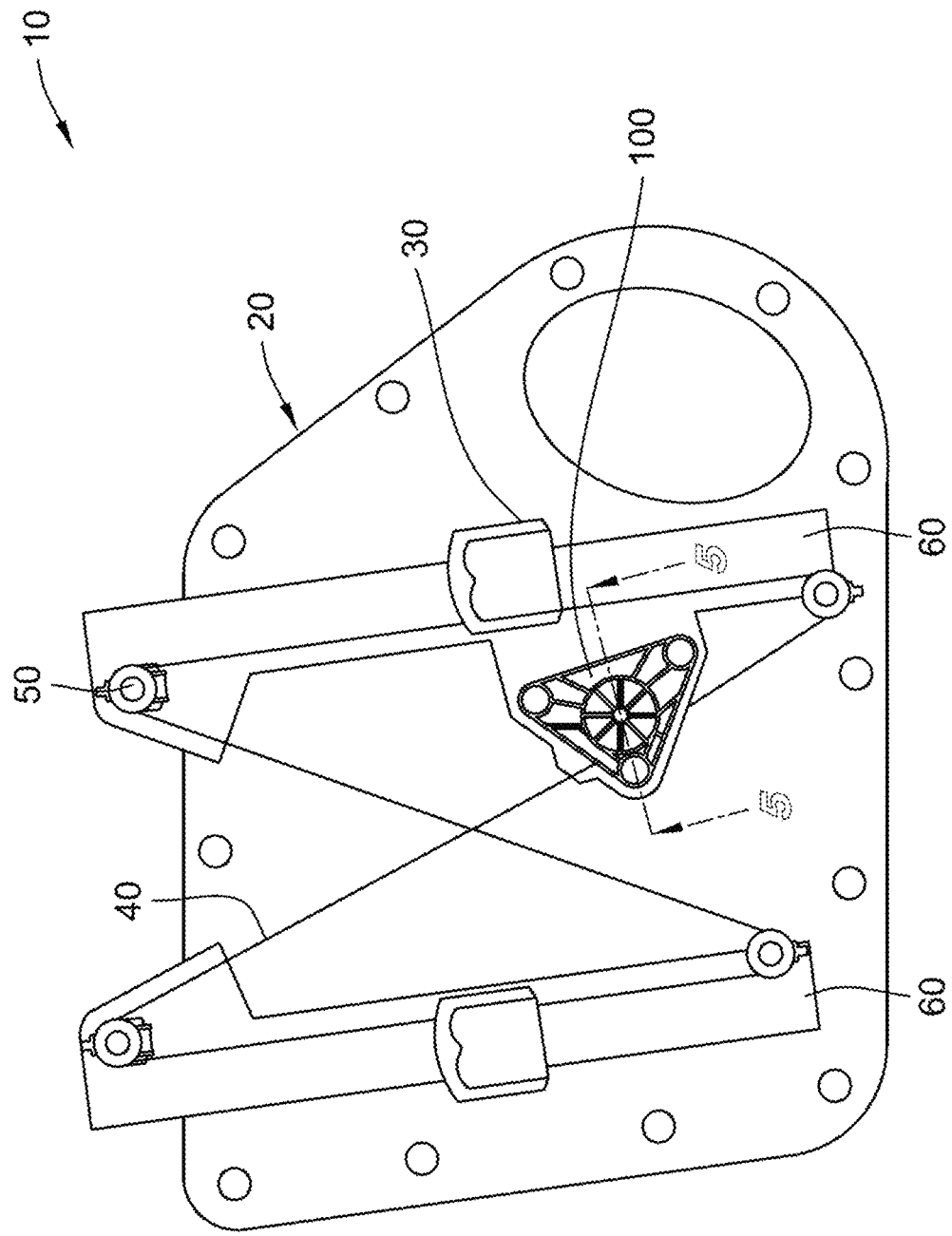
FIG. 1 is a perspective view of a window regulator assembly for guiding a cable in accordance with the present disclosure.

FIG. 1 illustrates a window regulator assembly 10 in a motor vehicle. The window regulator assembly 10 shown in FIG. 1 includes a module plate 20, window carriers 30, a cable 40, cable pulleys 50 and a drive unit 100. Each of the window carriers 30 is engaged with guide rails 60 and caused to travel up and down along the guide rails 60. In a conventional window regulator assembly, the guide rails 60 are generally attached to a module plate for being used as a guide for the movement of a window between open and closed position. In accordance with an aspect of the present disclosure, the guide rails 60 are preferably unitarily formed with the module plate 20 as a single piece. Accordingly, as shown in FIG. 1, the integrally formed module plate 20 with the guide rails 60 is described as the combined module plate 20.

The module plate 20 is made from a thermoplastic material in order to reduce weight and to simplify integration with and provides support for other components such as the window carriers 30 and the drive unit 100. The window carriers 30 include a window clamp arrangement (not shown) which is engaged with window. Each window carrier 30 is attached or connected to the cable 40. Such attachments or connection may be made by clamps, fasteners, adhesives, press fitting, snap fittings, or any other means.

Figure 2:
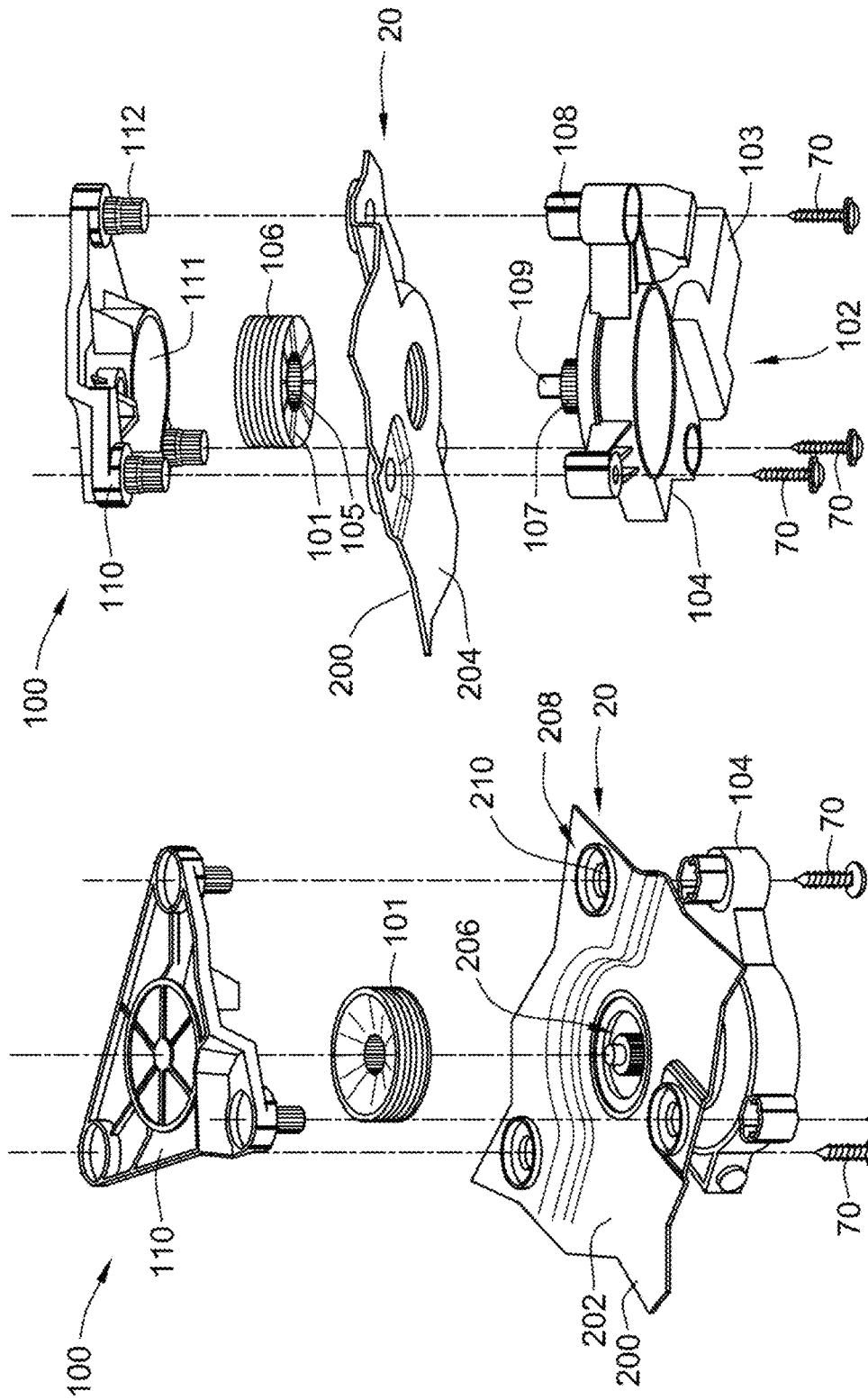
FIGS. 2A-2B are exploded views of a drive unit with a module plate in the window regulator assembly of FIG. 1 in accordance with the present disclosure.

As shown in FIG. 1, the module plate 20 further provides support for the drive unit 100. The drive unit 100 is generally mounted on the module plate 20. As shown in an exploded view of FIGS. 2A and 2B, the drive unit 100 includes three principal components; a cable drum 101, a motor assembly 102 and a cable drum housing 110. In FIG. 1, the drive unit 100 drives the cable 40 coupled to the window carriers 30 fastened to the window for moving the window between open and closed position.

In FIGS. 2A and 2B, the motor assembly 102 includes an electric motor 103 which is fastened to a gear housing 104, having internal components not illustrated in the drawings. The internal components include a worm gear driven by a motor shaft and a ring gear enclosed by the dome-shaped of the gear housing 104. As described above, the motor assembly 102 is generally attached to or supported by the module plate 20 as a sub-assembly of the drive unit 100.

As shown in FIGS. 1, 2A and 2B, the drive unit 100 includes the cable drum 101 forming a splined inner bore 105 with an outer grooved cylindrical surface 106 for guiding and supporting the cable 40 in the window regulator assembly 10. The splined inner bore 105 of the cable drum 101 is configured for engaging with a splined stub shaft 107 of the motor assembly 102 when the drive unit 100 is assembled. During a typical assembly process, the cable drum 101 having the cable 40 wound on the outer grooved cylindrical surface 106 is first placed within a central cavity 111 of the cable drum housing 110.

In accordance with an aspect of the present disclosure, as shown in FIGS. 2A and 2B, the drive unit 100 is coupled to the module plate 20 having a receiving site 200 for placing the drive unit 100 on the module plate 20. The receiving site 200 includes a first side 202 for placing the cable drum housing 110 with the cable drum 101, and a second side 204 for placing the motor assembly 102 on an opposite side from the first side 202. The receiving site 200 includes a center hole 206 for allowing the splined stub shaft 107 of the motor assembly 102 to pass through the receiving site 200 and engage with the splined inner bore 105 of the cable drum 101. The receiving site 200 further includes at least one locating site 208 for allowing at least one snap-fit post 112 of the cable drum housing 110 to place on the receiving site 200 of the module plate 20.

Figure 3:
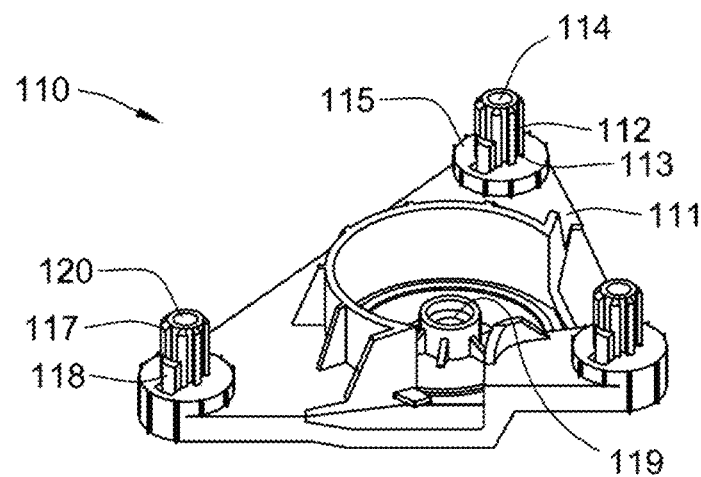
FIG. 3 is a perspective view of a cable drum housing in accordance with the present disclosure.

FIG. 3 illustrates the cable drum housing 110. As described above, the cable drum housing 110 has the central cavity 111 for placing the cable drum 101 and the snap-fit post 112 for coupling with the locating site 208 of the module plate 20 and the motor assembly 102. The central cavity 111 of the cable drum housing 110 is configured to receive the cable drum 101, and includes a journal bearing 119 for engaging with the splined stub shaft 107 of the motor assembly 102 (see FIGS. 2A and 2B). The cable drum housing 110 includes at least one stepped annular ring 115 extended from the cable drum housing 110. A first end 113 of the snap-fit post 112 is attached to the stepped annular ring 115 of the cable drum housing 110 and protruded towards a second end 114 of the snap-fit post 112. The snap-fit post 112 and the stepped annular ring 115 are concentric and the snap-fit post 112 is generally smaller diametric size than the stepped annular ring 115. The cable drum housing 110 may be generally made of a molded plastic material. However, the cable drum housing 110 is formed by other suitable materials in accordance with other forms of the present disclosure.

As shown in FIGS. 2B and 3, the protruded snap-fit post 112 has a spline shape 117 on outer surface of the snap-fit post 112 for clearance fitting into a mating socket 108 of the gear housing 104. The protruded snap-fit post 112 includes a pair of flanges 118 extended from the stepped annular ring 115 and attached to the outer surface of the snap-fit post 112. The flanges 118 are configured for coupling to a central opening 210 of the locating site 208 (shown in FIG. 2A). The protruded snap-fit post 112 further includes a hole 120 at the second end 114 of the snap-fit post 112 for allowing a screw element 70 to insert into the hole 120 in a final assembled configuration.

Figure 4:
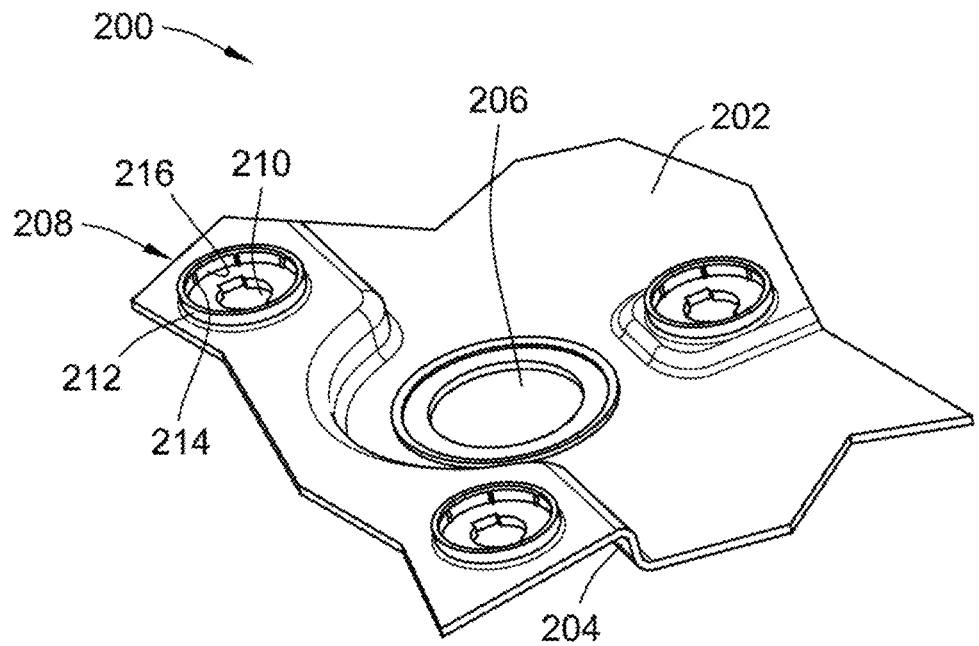
FIG. 4 is a perspective view of a receiving site of the module plate for receiving the cable drum housing in accordance with the present disclosure.

FIG. 4 illustrates the receiving site 200 of the module plate 20. The receiving site 200 includes the locating sites 208 for placing the snap-fit post 112 with the stepped annular ring 115 of the cable drum housing 110 on the first side 202 of the receiving site 200. Each of the locating sites 208 has a circular bead 212 around the central opening 210 for engaging with the stepped annular ring 115 of the cable drum housing 110. The stepped annular ring 115 is press fitted inside the circular bead 212 of the locating site 208 because at least one first crush rib 214 protrudes from an inner surface 216 of the circular bead 212 such that a circumferential outer surface of the stepped annular ring 115 contacts the inner surface 216 of the circular bead 212. Preferably, the circumferential outer surface of the stepped annular ring 115 entirely contacts the inner surface 216 of the circular bead 212 because the first crush rib 214 is crushed when they are fully assembled. The circular bead 212 of the locating site 208 is generally configured to easily position the cable drum housing 110 on the module plate 20 during the assembly process. Furthermore, the circular bead 212 of the receiving site 200 is configured to prevent water leakage to the inside of the vehicle by creating labyrinth configuration.

Figure 3A:
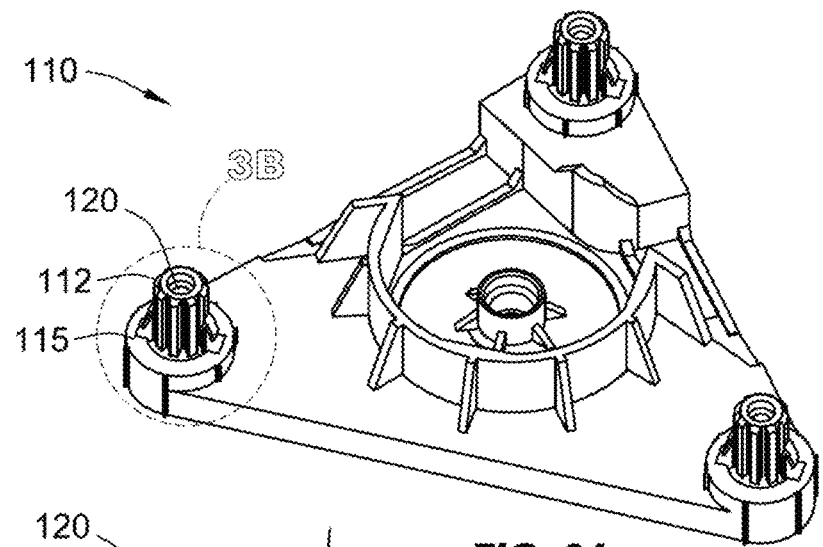
FIG. 3A is a perspective view of a cable drum housing in accordance with another form of the present disclosure.
Figure 3B:
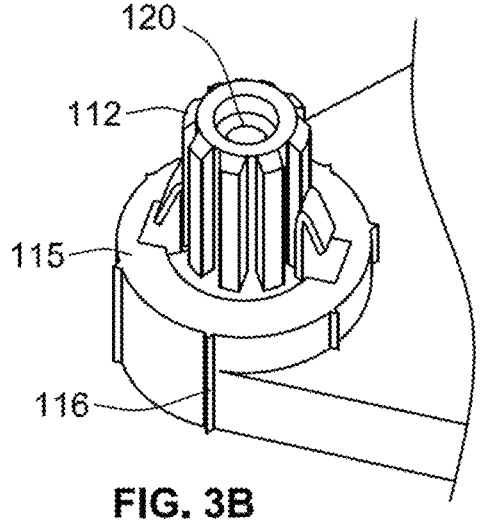
FIG. 3B is an enlarged view of a stepped annular ring of the cable drum housing of FIG. 3A.

In accordance with other form of the present disclosure, as shown in FIGS. 3A and 3B, instead of the first crush rib 214 of the circular bead 212, the stepped annular ring 115 may have at least one second crush rib 116 on its circumferential outer surface for being press fitted inside the circular bead 212 that does not have the first crush rib 214. The press fitting feature such as the first or second crush ribs 214, 116 is configured for providing better anti-rotation feature between the cable drum housing 110 and the module plate 20 by making a tight condition during the assembly process.

In accordance with other form of the present disclosure, both the circular bead 212 of the receiving site 200 and the stepped annular ring 115 of the cable drum housing 110 may have tapered contacting surfaces for being tightly fitted when the cable drum housing 110 is placed on the module plate 20. For example, the inner surface 216 of the circular bead 212 and the circumferential outer surface of the stepped annular ring 115 are parallelly tapered such that both surfaces are tightly fitted and entirely contacted. Accordingly, due to the tightly press fitting features of the present disclosure, the drive unit 100 can achieve more robustness against the torque applied by the electric motor 103, and it is dimensionally easy to control during the assembly because the circular bead 212 of the receiving site 200 and the stepped annular ring 115 of the cable drum housing 110 are concentric with the screw hole 120 of the snap-fit post 112.

In accordance with other form of the present disclosure, the stepped annular ring 115 has a top surface 121 to which the first end 113 of the snap-fit post 112 is attached. As shown in FIG. 6, the top surface 121 is sloped radially outwardly from a center axis Xs of the stepped annular ring 115, and the snap-fit post 112 extends from the top surface 121 along the center axis Xs of the stepped annular ring 115.

For example, the sloped top surface 121 of the stepped annular ring 115 is formed with a convex shape or a conical shape. As shown in FIG. 6A, furthermore, the top surface 121 is also formed with an inverted conical shape or a concave shape.

In addition, as shown in FIG. 7, the locating site 208 includes a mating surface 220, which is enclosed by the circular bead 212. The mating surface 220 is parallelly or curvedly formed and contacted to the top surface 121 of the stepped annular ring 115 in an assembled configuration where the cable drum housing 110 and the module plate 20 are assembled. Accordingly, the mating surface 220 is also sloped radially outwardly from a center axis Xc of the central opening 210 such that the mating surface 220 is formed with a concave shape or an inverted conical shape for entirely contacting to the top surface 121 having the convex shape or the conical shape (see FIG. 8).

In addition, when the top surface 121 of the stepped annular ring 115 is formed with the concave shape or the inverted conical shape as shown in FIG. 6A, the mating surface 220 of the locating site 208 is also formed with a convex shape or a conical shape for contacting and fitting to the top surface 121 as shown in FIG. 7A. Accordingly, in the assembled configuration, the contacted surfaces are compressively secured and configured to limit a lateral movement of the cable drum housing 110 in a vehicle condition. In particular, the convex mating surface 220 of the locating site 208 as shown in FIG. 7A is not enclosed by the circular bead 212. Instead, the convex mating surface 220 protrudes outward from the first side 202 of the receiving site 200.

FIG. 8 shows a cross-sectional view of the drive unit assembly with the module plate. In FIG. 8, the convex top surface 121 of the stepped annular ring 115 is entirely contacted and fitted with the concave mating surface 220 of the locating site 208 for preventing the lateral movement of the cable drum housing 110 in the vehicle condition. In FIG. 8A, as described above, the shapes of the top surface 121 and the mating surface 220 are swapped such that the concave top surface 121 of the stepped annular ring 115 is entirely contacted and fitted with the convex mating surface 220 of the locating site 208.

In particular, as shown in FIG. 8, a portion of the extended stepped annular ring 115 from the cable drum housing 110 defines a length L and a portion of the protruded circular bead 212 from the first side 202 of the module plate 20 also defines a height H such that, in the assembled configuration, a clearance C is defined by a difference between the height H of the protruded circular bead 212 and the length L of the extended stepped annular ring 115. For example, the clearance C is generally greater than 0.2 mm. Due to the clearance C, an interference such as a contact between the circular bead 212 of the module plate 20 and the cable drum housing 110 in the assembled configuration is prevented. Accordingly, both surfaces are entirely contacted and compressively secured in the assembled configuration.

Figure 5:
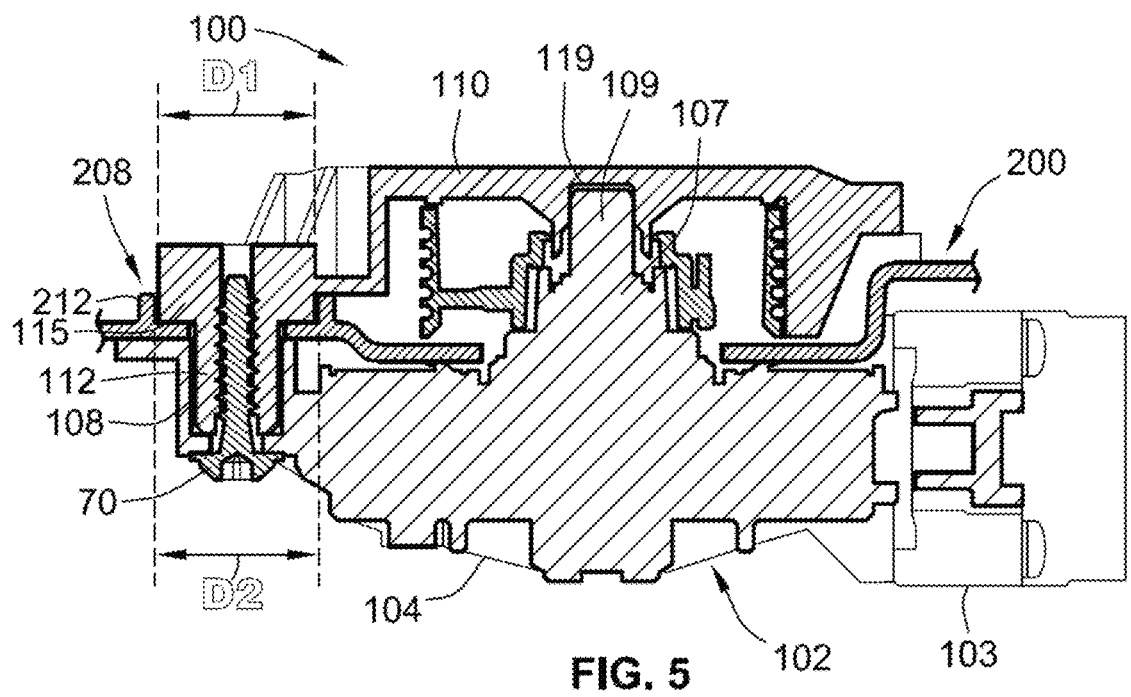
FIG. 5 is a cross-sectional view of the drive unit assembly with the module plate of FIG. 1, taken along line 5-5 of FIG. 1.

As shown in FIGS. 1 and 5, the drive unit 100 is fully assembled with the module plate 20. As shown in FIG. 5, when the stepped annular ring 115 is press fitted inside the circular bead 212 of the locating site 208, the snap-fit post 112 is allowed to pass through the central opening 210 of the locating site 208 and engage with the mating socket 108 of the motor assembly 102 on the second side 204 of the receiving site 200, and is clearance fitted inside the mating socket 108 of the motor assembly 102. Furthermore, the snap-fit post 112 of the cable drum housing 110 and the mating socket 108 of the motor assembly 102 are fastened by the screw element 70.

As shown in FIG. 5, a diameter D1 of the stepped annular ring 115 is smaller than an inner diameter D2 of the circular bead 212 for press fitting inside the circular bead 212. Accordingly, the circular bead 212 of the locating site 208 encircles the stepped annular ring 115 of the cable drum housing 110 in an initial assembled configuration of the cable drum housing 110 and the module plate 20.

With reference to FIGS. 2A through 5, the assembly process for the drive unit 100 with the module plate 20 is described. The cable drum 101 is first installed within the central cavity 111 of the cable drum housing 110. Typically, the cable drum 101 would have been previously wound with the cable 40 (shown in FIG. 1). Next, the cable drum housing 110 with the cable drum 101 is placed on the first side 202 of the receiving site 200 on the module plate 20. In the initial assembly of the cable drum housing 110 with the receiving site 200 of the module plate 20, the circular bead 212 on each of the locating sites 208 encircles the stepped annular rings 115 of the cable drum housing 110. In the initial assembled configuration, the flanges 118 of the snap-fit post 112 is engaged with the central opening 210 on each of the locating sites 208. Accordingly, in the initial assembled configuration, the cable drum housing 110 is easily and accurately positioned on the module plate 20 without any other parts such as a locator pin on the module plate 20.

After assembling the cable drum housing 110 with the module plate 20, the motor assembly 102 with the gear housing 104 is easily positioned to the second side 204 of the receiving site 200. The mating socket 108 of the motor assembly 102 receives the snap-fit post 112 passing through the central opening 210 of each of the locating sites 208. The snap-fit post 112 is clearance fitted into the mating socket 108 due to the spline shape 117 on the outer surface of the snap-fit post 112. By fitting the snap-fit post 112 into the mating socket 108, the cable drum housing 110 and the motor assembly 102 are retained to the module plate 20 before the screw element 70 is installed. When the motor assembly 102 is assembled with the cable drum housing 110, the splined stub shaft 107 of the motor assembly 102 is placed into the splined inner bore 105 of the cable drum 101 and fitted the inner bore 105 of the cable drum 101. As shown in FIG. 5, furthermore, the journal bearing 119 inside the central cavity 111 of the cable drum housing 110 is designed for mounting an end 109 of the splined stub shaft 107. The drive unit 100 and the module plate 20 are finally fastened by the screw element 70. Accordingly, the drive unit 100 is assembled with the module plate 20, and this provides the desired highly accurate relative positioning of the components in the final assembled configuration.

It should be noted that in the drawings, three locating sites 208 including the circular beads 212 are engaged with three snap-fit posts 112 of the cable drum housing 110. However, in accordance with other forms of the present disclosure, a greater or less number of such features may be implemented.

The foregoing description of various forms of the invention has been presented for purposes of illustration and description. It is not intended to be exhaustive or to limit the invention to the precis forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A drive unit assembly for a window regulator in a vehicle, the drive unit assembly comprising:
    a cable drum housing including;
    a stepped annular ring extending from the cable drum housing, the stepped annular ring having a top surface sloped radially outwardly from a center axis of the stepped annular ring such that the top surface is formed with a convex shape, and
    a snap-fit post extending from the top surface of the stepped annular ring along the center axis, the snap-fit post being concentric with the stepped annular ring and having a smaller diametric size than the stepped annular ring; and
    a module plate formed with a locating site including a circular bead for receiving the stepped annular ring of the cable drum housing and a central opening for coupling with the snap-fit post,
    wherein the locating site further includes a mating surface, which is enclosed by the circular bead and in contact with the top surface of the stepped annular ring in an assembled configuration where the cable drum housing and the module plate are assembled such that the contacted surfaces are configured to limit a movement of the cable drum housing, and
    wherein the mating surface of the locating site is sloped radially outwardly from a center axis of the central opening such that the mating surface is formed with a concave shape, and
    wherein the concave mating surface of the locating site is enclosed by the circular bead such that the concave mating surface is in contact with the convex top surface of the stepped annular ring within the circular bead of the locating site.

2. The drive unit assembly of claim 1, wherein the concave shape of the mating surface of the locating site is entirely in contact with the convex shape of the top surface of the stepped annular ring.

3. The drive unit assembly of claim 2, wherein in the assembled configuration, the convex top surface and the concave mating surface are compressively secured such that the top and mating surfaces prevent a lateral movement of the cable drum housing when used in a vehicle .

4. The drive unit assembly of claim 2, wherein a portion of the stepped annular ring extending from the cable drum housing defines a length L and a portion of the circular bead protruding from the module plate defines a height H such that, in the assembled configuration, a clearance C between the protruding circular bead and the extending stepped annular ring is defined.

5. The drive unit assembly of claim 4, wherein, in the assembled configuration, the clearance C defined by a difference between the height H of the protruding circular bead and the length L of the extending stepped annular ring is greater than 0.2 mm.

6. The drive unit assembly of claim 1, wherein in the assembled configuration, the snap-fit post passes through the module plate for engaging with a motor assembly such that the module plate is positioned between the cable drum housing and the motor assembly.

7. A drive unit assembly for a window regulator in a vehicle, the drive unit assembly comprising:
    a cable drum housing including;

a stepped annular ring extending from the cable drum housing, the stepped annular ring having a top surface sloped radially outwardly from a center axis of the stepped annular ring such that the top surface is formed with a concave shape, and a snap-fit post extending from the top surface of the stepped annular ring along the center axis, the snap-fit post being concentric with the stepped annular ring and having a smaller diametric size than the stepped annular ring; and a module plate formed with a locating site including a mating surface for engaging with the stepped annular ring of the cable drum housing and a central opening for coupling with the snap-fit post, wherein the mating surface protruding from a first side of the module plate is formed with a convex shape to be entirely in contact with the top surface of the stepped annular ring in an assembled configuration where the cable drum housing and the module plate are assembled such that the contacted surfaces are configured to limit a movement of the cable drum housing.

8. The drive unit assembly of claim 7, wherein in the assembled configuration, the concave top surface and the convex mating surface are compressively secured such that the top and mating surfaces prevent a lateral movement of the cable drum housing when used in a vehicle.

9. A drive unit assembly for a window regulator in a vehicle, the drive unit assembly comprising:

a cable drum housing including;

a stepped annular ring extending from the cable drum housing, the stepped annular ring having a top surface sloped radially outwardly from a center axis of the stepped annular ring such that the top surface is formed with a convex shape, and a snap-fit post extending from the top surface of the stepped annular ring along the center axis, the snap-fit post being concentric with the stepped annular ring and having a smaller diametric size than the stepped annular ring; and a module plate formed with a locating site including a circular bead for receiving the stepped annular ring of the cable drum housing and a central opening for coupling with the snap-fit post, wherein the locating site further includes a mating surface, which is enclosed by the circular bead and in contact with the top surface of the stepped annular ring in an assembled configuration where the cable drum housing and the module plate are assembled such that the contacted surfaces are configured to limit a movement of the cable drum housing, and wherein the mating surface of the locating site is sloped radially outwardly from a center axis of the central opening such that the mating surface is formed with a concave shape, which is entirely in contact with and fitted to the convex shape of the top surface of the stepped annular ring.

\* \* \* \* \*